US 8,886,418 B2

(12) United States Patent
Yücel et al.

(10) Patent No.: US 8,886,418 B2
(45) Date of Patent: Nov. 11, 2014

(54) FUEL OPTIMIZATION DISPLAY

(75) Inventors: Sermet Yücel, Edina, MN (US);
William D. Headrick, Maplewood, MN (US); Samuel E. Martin, St. Paul, MN (US); M. Germana Paterlini, Edina, MN (US); Jon M. Magnuson, St. Paul, MN (US)

(73) Assignee: FuelMiner, Inc., Minneapolis, MN (US)

( * ) Notice: Subject to any disclaimer, the term of this patent is extended or adjusted under 35 U.S.C. 154(b) by 165 days.

(21) Appl. No.: 13/251,711

(22) Filed: Oct. 3, 2011

(65) Prior Publication Data

US 2013/0046449 A1    Feb. 21, 2013

Related U.S. Application Data

(60) Provisional application No. 61/524,832, filed on Aug. 18, 2011.

(51) Int. Cl.
*B60W 50/00* (2006.01)
*F16H 61/02* (2006.01)
*F16H 63/42* (2006.01)

(52) U.S. Cl.
CPC ...... *F16H 61/0213* (2013.01); *F16H 2063/426* (2013.01); *F16H 2061/0218* (2013.01); *F16H 2061/022* (2013.01)
USPC ............. 701/51; 701/103; 701/110; 701/123; 701/31.4; 701/58; 340/439; 340/441; 340/450.2

(58) Field of Classification Search
CPC ............. B60W 2540/10; F02D 11/105; F16H 2061/0218; F16H 2063/426; F16H 59/18
USPC ............... 701/102, 52, 70, 51, 123, 16, 36, 1, 701/115, 22, 533, 103, 2; 180/65.1, 65.29; 340/932.2, 439, 441, 450.2; 705/7.38, 705/7.42; 715/212
See application file for complete search history.

(56) References Cited

U.S. PATENT DOCUMENTS

| | | | |
|---|---|---|---|
| 8,290,701 B2 | 10/2012 | Mason | |
| 2005/0021222 A1* | 1/2005 | Minami et al. | 701/123 |
| 2005/0096836 A1* | 5/2005 | Minami et al. | 701/123 |

(Continued)

FOREIGN PATENT DOCUMENTS

| | | | |
|---|---|---|---|
| JP | 2002370560 | | 12/2002 |
| JP | 2002370560 A | * | 12/2002 |

OTHER PUBLICATIONS

JPO_machine Translation_JP2002370560A.*
JPO_machine translation_JP2002370560A.*
D. Le Guen, "Definition of Gearshift Pattern: Innovative Optimization Procedures Using System Simulation", Apr. 12, 2011. file name: LeGuen_2011_04_12.pdf.*

(Continued)

*Primary Examiner* — Helal A Algahaim
*Assistant Examiner* — Jelani Smith
(74) *Attorney, Agent, or Firm* — Beck & Tysver, PLLC

(57) ABSTRACT

The present invention is an apparatus and method for guiding the driver of a vehicle in selecting an accelerator pedal position and transmission gear to improve a score. The score may be a weighted average of a fuel economy score and a drivability score. A curve showing the best score for each gear may be shown on a display as a function of accelerator pedal and transmission gear number, along with the current accelerator pedal and gear number of the vehicle. The driver may improve the score by changing to an accelerator pedal and/or gear selection that is closer to the curve. The curve may be calculated, using a model based on forces and torques upon the vehicle, from data acquired by monitoring the vehicle and/or from external sources.

33 Claims, 28 Drawing Sheets

(56) References Cited

U.S. PATENT DOCUMENTS

| | | | |
|---|---|---|---|
| 2006/0015235 A1* | 1/2006 | Ringger et al. | 701/51 |
| 2006/0089774 A1 | 4/2006 | Steen | |
| 2007/0112475 A1 | 5/2007 | Koebler | |
| 2007/0173993 A1 | 7/2007 | Nielsen | |
| 2008/0243324 A1* | 10/2008 | Harris | 701/22 |
| 2009/0251304 A1* | 10/2009 | Saito et al. | 340/441 |
| 2009/0288636 A1 | 11/2009 | Saito | |
| 2010/0073158 A1 | 3/2010 | Uesaka | |
| 2011/0184642 A1* | 7/2011 | Rotz et al. | 701/201 |
| 2012/0022764 A1* | 1/2012 | Tang et al. | 701/102 |
| 2012/0022904 A1 | 1/2012 | Mason et al. | |
| 2012/0221215 A1* | 8/2012 | Sugiyama et al. | 701/51 |
| 2012/0221216 A1* | 8/2012 | Chauncey et al. | 701/51 |

OTHER PUBLICATIONS

SAE 2011 World Congress & Exhibition, Tuesday Apr. 12, 2011 Schedule. file name: ASE Apr. 12, 2011.pdf.*
Rachel Metz, Gadget Gets Under the Hood to Bring Analytics to Driving, MIT Technology Review, Mar. 12, 2013; http://www.technologyreview.com/news/512211/gadget-gets-under-the-hood-to-bring-analytics-to-driving/? utm_campaign=newsletters&utm_source=newsletter-daily-all&utm_medium=email&utm_content=20130313.
Feb. 26, 2013 Office Action (U.S. Appl. No. 13/285,350).
Feb. 25, 2013 Office Action (U.S. Appl. No. 13/285,340).
Apr. 4, 2014 USPTO Office Action (U.S. Appl. No. 13/285,340).
Apr. 4, 2014 USPTO Office Action (U.S. Appl. No. 13/285,350).

* cited by examiner

| REF. 130 | SYM. 131 | DEFINITION 132 | MEAS. 133 | EQN. 134 | SPEC. 135 | VBL. 136 | USED 137 |
|---|---|---|---|---|---|---|---|
| 101 | $\hat{\kappa}_\theta$ | Current accelerator pedal position | CAN | | | | Display |
| 102 | $\hat{\kappa}_c$ | Current clutch pedal position, $0 \leq \kappa_c \leq 1$ | CAN | | | | Display |
| 103 | $\hat{\Gamma}$ | Current transmission gear number | CAN | (46) | | | |
| 104 | $S_f$ | Fuel economy score | | (1) | | | (1) (5) |
| 105 | $\bar{S}_f$ | Time-averaged fuel economy score | | (13) | | | Display |
| 106 | $W_f$ | Fuel economy weight factor | | | User | | (5) |
| 107 | $D(t)$ | Instantaneous drivability at full accelerator from steady state at fixed gear | | (2) | | | (2) (3) |
| 108 | $\bar{D}$ | Average drivability | | (3) | | | (3) (4) |
| 109 | $D_{max}$ | Maximum drivability for vehicle | History | | Mfr. | | (4) |
| 110 | $S_D$ | Drivability score | | (4) | | | (4) (5) |
| 111 | $\bar{S}_D$ | Time-averaged drivability score | | (14) | | | Display |
| 112 | $W_D$ | Drivability weight factor | | | User | | (5) |
| 113 | $S$ | Score | | (5) | | | (5) (6) (7) |
| 114 | $\hat{S}$ | Current score | | (5) | | | Display |
| 115 | $S_\Gamma$ | Score as a function of accelerator position for fixed transmission gear | | (6) | | | (6) (8) |
| 116 | $S_\Gamma^*$ | Best score for gear # $\Gamma$ | | (7) | | | (7) (8) (9) (10) |
| 117 | $S^*$ | Best score for any gear | | (9) | | | (9) (10) |
| 118 | $\Delta\kappa_\theta$ | Accelerator step size for grid | | | User | | Display |
| 119 | $\kappa_\theta$ | Accelerator position | | (8) | | x | (6) (7) (8) (23) |
| 120 | $\kappa_{\theta\Gamma}^*$ | Best accelerator position for gear # $\Gamma$ | | (10) | | | (8) (11) |
| 121 | $\Gamma^*$ | Best gear number | | (11) | | | (10) (11) |
| 122 | $\kappa_\theta^*$ | Best accelerator position | | (15) | | | (11) |
| 123 | $\bar{S}$ | Time-averaged score | | | | | Display |

*FIG. 1*

| REF. | SYM. | DEFINITION | MEAS. | EQN. | SPEC. | VBL. | USED |
|---|---|---|---|---|---|---|---|
| 201 | $\bar{v}(t)$ | Vehicle velocity | ECU, GPS | | | | (16) (17) (19) (72) |
| 202 | $v$ | Vehicle speed | ECU | | | | (16) (18) (26) (63) |
| 203 | $s$ | Distance traveled | | (18) | | | (18) |
| 204 | $\bar{a}(t)$ | Vehicle acceleration | | (19) | | | (19) (20) (64) |
| 205 | $a$ | Magnitude of vehicle acceleration | | (20) | | | (20) (21) |
| 206 | $\bar{x}(t)$ | Vehicle position | | (17) | | | (17) (64) |
| 207 | $a_D$ | Magnitude of reserved vehicle acceleration | | (22) | | | (2) (22) |
| 208 | $M_L$ | Mass of payload | Scale | | | | (65) |
| 209 | $M_{CHASS}$ | Mass of chassis | | | Mfr. | | (65) |
| 210 | $M_W$ | Vehicle mass | | (65) | | | (65) (66) |
| 211 | $M_V$ | Effective vehicle mass | | (66) | | | (22) (66) (68) (70) |
| 212 | $t$ | Time | | | | x | (3) (12) |
| 213 | $t_1, t_2$ | Particular times, with $t_2 > t_1$ | | | User | | (3) (12) |
| 214 | $M_{BODY}$ | Mass of body | | | Mfr. | | (65) |
| 215 | $M_{TRAILER}$ | Mass of trailer | | | Mfr. | | (65) |

FIG. 2

| REF. | SYM. | DEFINITION | MEAS. | EQN. | SPEC. | VBL. | USED |
|---|---|---|---|---|---|---|---|
| 301 | $\mu$ | Trip fuel | | (25) | | | (25) |
| 302 | $\dot{\mu}$ | Fuel mass flow rate | ECU | (23), (24) | | | (23) (24) (25) (26) |
| 303 | $f(t)$ | Instantaneous fuel economy at steady state | | (26) | | | (12) (26) |
| 304 | $\bar{f}$ | Average fuel economy | | (12) | | | (1) (12) |
| 305 | $f_{max}$ | Maximum fuel economy | | | Mfr. | | (1) |
| 306 | $\omega_E$ | Engine angular speed | CAN | (61) | | | (23) (24) (38) |
| 307 | $\dot{\omega}_E$ | Engine angular acceleration | CAN | | | | (23) (24) (28) (29) (30) (50) |
| 308 | $\omega_{Ei}$ | Engine idle angular speed | CAN | | | | |
| 309 | $\omega_{EG}$ | Engine governed angular speed | | | | | |
| 310 | $\Theta_E$ | Engine moment of inertia | | | Mfr. | | (28) (50) (67) |
| 311 | $\tau_{Ei}$ | Engine indicated torque | CAN | | | | (27) |
| 312 | $\tau_{Ef}$ | Engine friction torque | CAN | | | | (27) |
| 313 | $\tau_{Eb}$ | Engine brake torque | CAN | (50) | | | (27) (33) (37) (50) |
| 314 | $\tau_{El}$ | Engine load torque | CAN | | | | (24) |
| 315 | $\tau_E$ | Engine effective torque | | (27) | | | (27) (28) |

FIG. 3

| REF. | SYM. | DEFINITION | MEAS. | EQN. | SPEC. | VBL. | USED |
|---|---|---|---|---|---|---|---|
| 401 | $\kappa_C$ | Clutch pedal position, $0 \leq \kappa_c \leq 1$ | | | | x | (34) |
| 402 | $\omega_{Ci}$ | Clutch input speed | | (30) | | | (30) (32) |
| 403 | $\omega_{Co}$ | Clutch output speed | | (32) | | | (31) (32) |
| 404 | $\Delta\omega_C$ | Clutch speed difference | | (34) | | x | (32) (34) |
| 405 | $\Delta\omega_{max}$ | Maximum clutch speed difference | | | Mfr. | | (34) |
| 406 | $\tau_{Ci}$ | Clutch input torque | | (33) | | | (33) (35) |
| 407 | $\tau_{Co}$ | Clutch output torque | | (35) | | | (35) (36) |
| 408 | $\tau_{C_{max}}$ | Clutch maximum friction torque | | (34) | Mfr. | | (34) (35) |
| 409 | $\tau_A$ | Parameter | | | Mfr. | | (34) |
| 410 | $\tau_B$ | Parameter | | | Mfr. | | (34) |

*FIG. 4*

| REF. | SYM. | DEFINITION | MEAS. | EQN. | SPEC. | VBL. | USED |
|---|---|---|---|---|---|---|---|
| 501 | $\omega_{TCi}$ | TC angular input (pump) speed | | (38) | | | (38) (42) (45) |
| 502 | $\omega_{TCo}$ | TC angular output (turbine) speed | | (42), (45) | | | (41) (42) (45) |
| 503 | $\tau_{TCi}$ | TC input torque | | (37) | | | (37) (39) |
| 504 | $\tau_{TCo}$ | TC output torque | | (39) | | | (39) (40) |
| 505 | $\nu_{TC}$ | TC speed ratio | | (44) | | | (42) (43)(44) |
| 506 | $\eta_{TC}$ | TC efficiency ratio | | | Mfr. | | (39) (44)(43) |
| 507 | $\zeta_{TC}$ | TC power ratio | | | Mfr. | | (44) |

*FIG. 5*

| REF. | SYM. | DEFINITION | MEAS. | EQN. | SPEC. | VBL. | USED |
|---|---|---|---|---|---|---|---|
| *601* | $\{\Gamma\}$ | Transmission gear numbers for vehicle | | | Mfr. | | (6) (9) (10) (11) |
| *602* | $\gamma_T$ | Transmission gear ratio | | | | x | (46) (47) (49) (56) |
| *603* | $\hat{\gamma}_T$ | Current transmission gear ratio | | (46) | Mfr. map | | (46) |
| *604* | $\{\gamma_{TF}\}_\Gamma$ | Forward transmission gears | | (46) | Mfr. map | | (46) |
| *605* | $\{\gamma_{TR}\}_\Gamma$ | Reverse transmission gears | | (46) | Mfr. map | | (46) |
| *606* | $\omega_{Ti}$ | Transmission input speed | CAN | (31) (41) | | | (31) (41) (49) |
| *607* | $\omega_{To}$ | Transmission output speed | | (49) | | | (49) (51) |
| *608* | $\eta_T$ | Transmission gear efficiency | | (47) | Mfr. map | | (47) (48) (57) |
| *609* | $\tau_{Ti}$ | Transmission input torque | | (36), (40) | | | (36) (40) (48) (50) (58) |
| *610* | $\tau_{To}$ | Transmission output torque | | (48) | | | (48) (52) |
| *611* | $\Theta_T$ | Transmission moment of inertia | | | Mfr. | | (67) |
| *612* | $n_T$ | Number of forward gears | | | Mfr. | | Display |

FIG. 6

| REF. | SYM. | DEFINITION | MEAS. | EQN. | SPEC. | VBL. | USED |
|---|---|---|---|---|---|---|---|
| 701 | $\omega_{RAi}$ | Rear axle input speed | | (51) | | | (51) (55) |
| 702 | $\omega_{RAo}$ | Rear axle output speed | | (55) | | | (55) |
| 703 | $\{\gamma_{RA}\}$ | Rear axle gears | | | Mfr. | | (53) (54) (55) (56) |
| 704 | $\hat{\gamma}_{RA}$ | Rear axle current gear ratio | CAN | | | | |
| 705 | $\eta_{RA}$ | Gear efficiency at gear ratio $\gamma_{RA}$ | | (53) | Mfr. map | | (53) (54) (57) |
| 706 | $\tau_{RAi}$ | Rear axle input torque | | (52) | | | (52) (54) |
| 707 | $\tau_{RAo}$ | Rear axle output torque | | (54) | | | (54) (58) (60) |
| 708 | $\Theta_{RA}$ | Rear axle moment of inertia | | | Mfr. | | (67) |

*FIG. 7*

| REF. | SYM. | DEFINITION | MEAS. | EQN. | SPEC. | VBL. | USED |
|---|---|---|---|---|---|---|---|
| 801 | $\tau_{TRAC}$ | Tractive torque | | (60) | | | (60) |
| 802 | $F_{TRAC}$ | Tractive force | | (59) | | | (22) (59) |
| 803 | $\gamma_{DL}$ | Effective combined gear ratio | | (56) | | | (56) (58) (61) (67) |
| 804 | $\eta_{DL}$ | Driveline efficiency | | (57) | | | (57) (58) |
| 805 | $\omega_W$ | Wheel angular speed | CAN | | | | (61) |
| 806 | $\dot{\omega}_W$ | Wheel angular acceleration | CAN | | | | (60) |
| 807 | $\Theta_W$ | Moment of inertia of tires | | | Mfr. | | (67) |
| 808 | $\Theta_V$ | Effective moment of inertia | | (67) | | | (60) (66) (67) |
| 809 | $r_W$ | Rear tire radius | | | Mfr. | | (59) (66) |
| 810 | $P_W$ | Tire pressure | CAN | | | | (63) |
| 811 | $T_W$ | Tire temperature | CAN | | | | (63) |

FIG. 8

| REF. | SYM. | DEFINITION | MEAS. | EQN. | SPEC. | VBL. | USED |
|---|---|---|---|---|---|---|---|
| 901 | $\kappa_B$ | Brake pedal position | | | | x | (62) |
| 902 | $\hat{\kappa}_B$ | Current brake pedal position | CAN | | | | |
| 903 | $F_B$ | Brake force | | (62) | Mfr. map | | (22) (62) |

FIG. 9

| REF. | SYM. | DEFINITION | MEAS. | EQN. | SPEC. | VBL. | USED |
|---|---|---|---|---|---|---|---|
| 1001 | $H$ | Elevation | GPS | | | | (71) |
| 1002 | $P_a$ | Air pressure: see (71) | CAN | | | | (71) |
| 1003 | $T_a$ | Air temperature: see (71) | CAN | | | | (71) |
| 1004 | $\rho_a$ | Air density | | (71) | | x | (71) (72) |
| 1005 | $v_{wind}$ | Wind speed | WWW | | | | (71) |
| 1006 | $A_v$ | Effective area of the vehicle | | | Mfr. | x | (72) |
| 1007 | $c_a$ | Aerodynamic drag coefficient | | | Mfr. | x | (72) |
| 1008 | $\alpha$ | Grade angle | GPS | | | | (64) (68) (70) |
| 1009 | $F_g$ | Longitudinal gravitational force | | (70) | | | (70) (73) |
| 1010 | $F_{gn}$ | Normal gravitational force | | (68) | | x | (68) (69) |
| 1011 | $g$ | Gravitational acceleration | | | Const. | | (68) (70) |
| 1012 | $F_a$ | Aerodynamic drag | | (72) | | x | (72) (73) |
| 1013 | $c_w$ | Rolling resistance coefficient | | | Tire Mfr. map | x | (63) (69) |
| 1014 | $F_w$ | Rolling resistance force | | (69) | | x | (69) (73) |
| 1015 | $F_{RESIST}$ | Resistive force | | (73) | | x | (22) (73) |

*FIG. 10*

| EQUATION 1920 | NUM. 1921 |
|---|---|
| $S_f = 100 \bar{f} / f_{max}$ | (1) |
| $D(t) = a_D$ | (2) |
| $\bar{D} = \int_{t_1}^{t_2} D(t) \, dt / (t_2 - t_1)$ | (3) |
| $S_D = 100 \bar{D} / D_{max}$ | (4) |
| $S = W_f S_f + W_D S_D$ | (5) |
| $S_\Gamma = S_\Gamma(\kappa_\theta) = S$ for fixed $\Gamma$ | (6) |
| $S_\Gamma^* = \max_{\kappa_\theta}(S_\Gamma)$ | (7) |
| $\kappa_{\theta\Gamma}^* = \kappa_\theta$ such that $S_\Gamma = S_\Gamma^*$ | (8) |
| $S^* = \max_\Gamma(S_\Gamma^*)$ | (9) |
| $\Gamma^* = \Gamma$ such that $S^* = S_\Gamma^*$ | (10) |
| $\kappa_{\theta\Gamma}^* = \kappa_{\theta\Gamma}^*$ such that $\Gamma = \Gamma^*$ | (11) |
| $\bar{f} = \int_{t_1}^{t_2} f(t) \, dt / (t_2 - t_1)$ | (12) |
| $\bar{S}_f = \int_{t_1}^{t_2} S_f \, dt / (t_2 - t_1)$ | (13) |
| $\bar{S}_D = \int_{t_1}^{t_2} S_D \, dt / (t_2 - t_1)$ | (14) |
| $S = W_f \bar{S}_f + W_D \bar{S}_D$ | (15) |

FIG. 19

| EQUATION | NUM. |
|---|---|
| $v = |\vec{v}(t)|$ | (16) |
| $\vec{x} = \int_{t_1}^{t_2} \vec{v}\, dt$ | (17) |
| $s = \int_{t_1}^{t_2} v\, dt$ | (18) |
| $\vec{a} = d\vec{v}/dt$ | (19) |
| $a = |\vec{a}|$ | (20) |
| Steady state: $\vec{a} = 0$ | (21) |
| $M_V a_D = F_{TRAC} - F_{RESIST} - F_B$ | (22) |

*FIG. 20*

| EQUATION | NUM. |
|---|---|
| $\dot{\mu} = \dot{\mu}(\kappa_\theta, \omega_E, \dot{\omega}_E)$ (from manufacturer specification) | (23) |
| $\dot{\mu} = \dot{\mu}(\tau_{Ei}, \omega_E, \dot{\omega}_E)$ (transient fuel map) | (24) |
| $\mu = \int_{t_1}^{t_2} \dot{\mu}(t)\, dt$ | (25) |
| $f(t) = v / \dot{\mu}$ | (26) |
| $\tau_E = \tau_{Ei} - \tau_{Ef} - \tau_{El}$ | (27) |
| $\Theta_E \dot{\omega}_E = \tau_E$ | (28) |
| Steady state: $\dot{\omega}_E = 0$ | (29) |

*FIG. 21*

| EQUATION | NUM. |
|---|---|
| $\omega_{Ci} = \omega_E$ | (30) |
| $\omega_{Co} = \omega_{Ti}$ | (31) |
| $\Delta\omega_C = \omega_{Co} - \omega_{Ci}$ | (32) |
| $\tau_{Ci} = \tau_{Eb}$ | (33) |
| $\tau_{C\max} = \text{sign}(\Delta\omega_C)\kappa_C \left[ \tau_A - (\tau_B - \tau_A)\exp\left(-\left|\dfrac{\Delta\omega_C}{\Delta\omega_{\max}}\right|\right) \right]$ | (34) |
| $\tau_{Co} = \begin{cases} \tau_{Ci} & \text{if } \tau_{Ci} \leq \tau_{C\max} \\ \tau_{C\max} & \text{otherwise.} \end{cases}$ | (35) |
| $\tau_{Ti} = \tau_{Co}$ | (36) |

*FIG. 22*

| EQUATION | NUM. |
|---|---|
| $\tau_{TCi} = \tau_{Eb}$ | (37) |
| $\omega_{TCi} = \omega_E$ | (38) |
| $\tau_{TCo} = \eta_{TC}\tau_{TCi}$ | (39) |
| $\tau_{Ti} = \tau_{TCo}$ | (40) |
| $\omega_{Ti} = \omega_{TCo}$ | (41) |
| $\nu_{TC} = \omega_{TCo}/\omega_{TCi}$ (Converter mode) | (42) |
| $\eta_{TC} = \eta_{TC}(\nu_{TC})$ (Converter mode) | (43) |
| $\zeta_{TC} = \eta_{TC}\nu_{TC}$ (Converter mode) | (44) |
| $\omega_{TCo} = \omega_{TCi}$ (Lock-up mode) | (45) |

*FIG. 23*

| EQUATION | NUM. |
|---|---|
| $\hat{\gamma}_T = \gamma_T(\hat{\Gamma})$ | (46) |
| $\eta_T = \eta_T(\gamma_T)$ | (47) |
| $\tau_{To} = \eta_T \gamma_T \tau_{Ti}$ | (48) |
| $\omega_{Ti} = \gamma_T \omega_{To}$ | (49) |
| $\tau_{Eb} = \Theta_E \dot{\omega}_E + \tau_{Ti}$ | (50) |

FIG. 24

| EQUATION | NUM. |
|---|---|
| $\omega_{RAi} = \omega_{To}$ | (51) |
| $\tau_{RAi} = \tau_{To}$ | (52) |
| $\eta_{RA} = \eta_{RA}(\gamma_{RA})$ | (53) |
| $\tau_{RAo} = \eta_{RA}\,\gamma_{RA}\,\tau_{RAi}$ | (54) |
| $\omega_{RAi} = \gamma_{RA}\,\omega_{RAo}$ | (55) |

FIG. 25

| EQUATION | NUM. |
|---|---|
| $\gamma_{DL} = \gamma_T \gamma_{RA}$ | (56) |
| $\eta_{DL} = \eta_T \eta_{RA}$ | (57) |
| $\tau_{RAo} = \eta_{DL} \gamma_{DL} \tau_{Ti}$ | (58) |
| $\tau_{TRAC} = r_W F_{TRAC}$ | (59) |
| $\tau_{RAo} = \Theta_V \dot{\omega}_W + \tau_{TRAC}$ | (60) |
| $\omega_E = \gamma_{DL} \omega_W$ | (61) |

FIG. 26

| EQUATION | NUM. |
|---|---|
| $F_B = F_B(\kappa_B)$ | (62) |

FIG. 27

| EQUATION | NUM. |
|---|---|
| $c_W = c_W(v, P_W, T_W)$ | (63) |
| $\alpha = \alpha(\bar{x})$ | (64) |
| $M_W = M_{CHASS} + M_{BODY} + M_{TRAILER} + M_L$ | (65) |
| $M_V = M_W + \Theta_V / r_W^2$ | (66)* |
| $\Theta_V = \gamma_{DL}^2 (\Theta_E + \Theta_T) + \Theta_W + \Theta_{RA}$ | (67)* |
| $F_{gn} = M_W\, g \cos(\alpha)$ | (68) |
| $F_W = c_W F_{gn}$ | (69) |
| $F_g = M_W\, g \sin(\alpha)$ | (70) |
| $\rho_a = \rho_a(P_a, T_a, H)$ (ideal gas law) | (71) |
| $F_a = c_a A_v \rho_a |v + v_{wind}|^2 / 2$ | (72) |
| $F_{RESIST} = F_W + F_g + F_a$ | (73) |

*Applies when transmission is manual and clutch is fully engaged, or transmission is automatic and torque converter is in lock-up mode.

FIG. 28

FUEL OPTIMIZATION DISPLAY

CROSS-REFERENCES TO RELATED APPLICATIONS

This application claims the benefit of U.S. Provisional Application No. 61/524,832, filed Aug. 18, 2011, and entitled "Fuel Optimization Display".

FIELD OF THE INVENTION

The present invention relates to a fuel optimization in vehicles. More specifically, the present invention relates to a user interface to guide a driver in selecting accelerator pedal position and gear.

BACKGROUND OF THE INVENTION

Improving fuel efficiency in heavy-duty vehicles provides numerous benefits to the national and global communities. Heavy-duty vehicles consume a substantial amount of diesel fuel and gasoline, increasing dependence on fossil fuels. In the United States, medium and heavy-duty vehicles constitute the second largest contributor within the transportation sector to oil consumption. "EPA and NHTSA Adopt First-Ever Program to Reduce Greenhouse Gas Emissions and Improve Fuel Efficiency of Medium- and Heavy-Duty Vehicles", Regulatory Announcement EPA-420-F-11-031, U.S. Environmental Protection Agency, August 2011 (hereinafter, "EPA Fact Sheet"). Currently, heavy-duty vehicles account for 17% of transportation oil use. "Annual Energy Outlook 2010", U.S. Energy Information Admin., Report DOE/EIA-0382 (2010), April 2010. Demand for heavy-duty vehicles is expected to increase 37% between 2008 and 2035 (EPA Fact Sheet), making the need for more fuel-efficient vehicles even more apparent.

Heavy-duty vehicles also emit into the atmosphere carbon dioxide, particulates, and other by-products of burning fossil fuels. The EPA estimates that the transportation sector emitted 29% of all U.S. greenhouse gases in 2007 and has been the fastest growing source of U.S. greenhouse gas emissions since 1990. "Inventory of US Greenhouse Gas Emissions and Sinks: 1990-2009", Report EPA 430-R-11-005, Apr. 15, 2011. By improving fuel efficiency in heavy-duty vehicles used in the U.S., the amount of greenhouse gases emitted could be drastically reduced. The benefits of improved fuel efficiency have prompted the Obama Administration to implement new regulations mandating stricter fuel efficiency standards for heavy-duty vehicles. In August 2011, the Environmental Protection Agency and the Department of Transportation's National Highway Traffic Safety Administration released the details of the Heavy Duty National Program, designed to reduce greenhouse gas emissions and improve fuel efficiency of heavy-duty trucks and buses. The Program will set forth requirements for fuel efficiency and emissions from heavy-duty vehicles between 2014 and 2018 in a first phase, and from 2018 and beyond in a second phase. The key initiatives targeted by this program are to reduce fuel consumption and thereby improve energy security, increase fuel savings, and reduce greenhouse gas emissions (EPA Fact Sheet). Creating sustainable processes for improving fuel efficiency of heavy-duty vehicles would allow vehicle owners to comply with the new emission standards, and would further the initiatives of the Heavy Duty National Program.

Poor fuel economy consumes resources that a vehicle operator might more profitably spend on opportunities that also benefit the economy as a whole. The EPA and Department of Transportation have estimated that the Heavy Duty National Program would result in savings of $35 billion in net benefits to truckers, or $41 billion total when societal benefits, such as reduced health care costs because of improved air quality, are taken into account. EPA Fact Sheet.

SUMMARY OF THE INVENTION

In the context of commercial vehicle fleets, a trip or mission often requires that a particular payload is moved from a point A to a point B at a particular time. The amount of fuel used for a mission will be affected by the particular choice of vehicle, by the geography (e.g., topography), by speed limits and other regulations, by traffic, and by the habits of the particular driver in operating the vehicle. Due to any or all of these factors, any mission can be expected to use more fuel than is optimal. Some of these factors, such as the choice of vehicle and how the driver operates the vehicle, can be manipulated, while others, such as regulations and traffic on a given route, cannot.

The inventor expects that the driver is often a major source of vehicle performance inefficiency. However, until now there has not been sufficient data to assess the magnitude of that inefficiency, an information gap that the data collection and analysis methodology of the invention will help to fill. Another goal of the invention is improving driver performance. By modeling vehicle dynamics and collecting and storing relevant data, factors subject to control of a driver or a fleet manager may be optimized.

Actual performance of a driver may be measured by one or more scoring functions. A scoring function may be based on indicia with regard to a "goodness" factor. For example, the fuel efficiency and the drivability of the vehicle are candidates for goodness factors that might each be rated by a respective scoring function. A given scoring function may be a composite of other scoring functions. Thus, an overall score might be a composite of a fuel efficiency score and a drivability score. A composite function may weight such scoring functions for individual goodness factors. The weighting may be constant, or might itself be a function of state of the vehicle. For example, acceleration (more specifically, positive acceleration) may be a factor in drivability, but the driver's need to accelerate is less at higher speeds. The overall scoring function might weight the vehicle's ability to accelerate more heavily, relative to fuel consumption, at slower speeds than at higher speeds.

The reserve or available acceleration is the acceleration that the vehicle would have at the current speed if the vehicle were given full throttle; in other words, the accelerator pedal is 100 percent depressed. Because reserve acceleration may be more important to drivability than actual acceleration, reserve acceleration may be preferable as a goodness factor in scoring. Whether reserve acceleration or actual acceleration is intended will be distinguished in particular contexts in this document.

A scoring function, for a goodness factor such as fuel efficiency, might involve a comparison of a measured value with, or ratio to, one or more reference values. A reference value for fuel efficiency might be, for example, (1) the best fuel efficiency ever measured for this particular vehicle; (2) the average fuel efficiency recorded by drivers in a fleet for this model of vehicle; (3) a government or manufacturer estimate of average fuel efficiency for this model of vehicle; (4) the best fuel efficiency achieved by any vehicle available from any manufacturer within this class of vehicles; or (5) a target fuel efficiency, possibly set by an expected future regulation or by a company's goals.

When operating a vehicle, driver manipulates certain vehicle "controls", such as a gear stick to control transmission gear, an accelerator pedal (or throttle pedal) to control fuel usage, and brake pedal to slow the vehicle. We may sometimes use "accelerator" or "throttle" as short for accelerator/throttle pedal; "gear" as short for "transmission gear stick"; and "brake" as short for brake pedal. If the vehicle has a manual transmission, the driver also controls the clutch position in order to shift gears. Because braking is dictated primarily by regulations and traffic, a driver's choices with respect to braking are unlikely to be much improved upon. Nor is it practical to change a driver's habits regarding the use of clutch and gear shift stick in moving from one gear to the next.

Drivability and fuel economy are dependent on accelerator position and transmission gear, and with regard to those particular vehicle controls, the driver usually has some choices. Consider exemplary individual scoring functions for drivability and fuel economy, and an overall scoring function that is a weighted average of them. At any given time while a vehicle is being driven, and for any given choice of transmission gear, there is expected to be an accelerator position that optimizes the overall scoring function (as well as accelerator positions that optimize the individual scores for the component factors). Thus, taken together, the optimal (with respect to the overall scoring function) gear-accelerator pair choices form a curve to which the driver may aspire. Each gear-accelerator optimal pair is associated with an efficiency score, a drivability score, and an overall score. One of the gear positions will have a highest overall score.

Depending on the formulation of the overall scoring function, the various scores, and hence the curve, may either be static for a particular mission, or change over time. For example, if weightings of component scores change with vehicle speed, then the shape of the curve may change frequently or even constantly. Environmental factors may also cause the curve to evolve, such as road rolling resistance, aerodynamic drag due to wind changes, road grade, temperature, elevation, rain or snow, and ice.

Indicia of driver performance include current values of variables relating to fuel-efficiency. By "current" we mean averaged over a short period, e.g., over an interval of 10 seconds or some shorter period. By "instantaneous" or "near real time" we mean a time no more than 1 second. Variables may include some or all of the following: current gear and accelerator control positions; the actual drivability, fuel-efficiency, and overall scores that the vehicle is presently achieving under control the driver; the optimal gear-accelerator pairs and their scores; and the evolving aspirational curve. The indicia may also include indicia spanning longer times than "current", such as values averaged or integrated since the start of the mission. These may include, for example, average fuel consumption rate, total fuel used, total miles driven, and average values of various goodness scores.

Such indicia of driver performance may be shown through a user interface (UI) on a monitor or display. The vehicle may be equipped with such a UI to influence the driver's operation of the vehicle. A chart may display the current grid-accelerator pair and a curve of optimal grid-accelerator pairs, and include respective representations of scores for these various pairs. A driver, or a group of drivers, might be recognized for meeting or exceeding threshold values of one or more of the indicia during a single mission, or averaged over a set of missions in an awards program sponsored by a fleet manager.

Such indicia of driver performance may be collected in tangible electronic storage (e.g., memory, flash drive, solid state disk, rotational media drive). Such storage may be located on the vehicle itself, at some remote location, or some combination thereof. Data about the vehicle design, the state of the vehicle and its components (including, for example, driver controls, fuel consumption, powertrain state, payload, and environmental conditions) may also be saved to such storage. Data may be collected from various sources including, for example: a controller-area network (CAN) on the vehicle; other sensors on the vehicle, such as a global position system (GPS) sensor; environmental sensors on the vehicle; external sources such as weather stations; and manufacturers' specifications for the vehicle or its components. Physical dynamics models may calculate unknown parameters from such data, and use the results as feedback to guide a driver.

A trip dynamics "executor" (TDE) may collect data from a vehicle and external sources, analyze that data, and initiate appropriate actions, for example, to provide diagnostics to a driver. The TDE may include a logger to collect relevant data, a kernel for to analyze information and control execution, and a monitor to provide diagnostics to a user. These elements may include or utilize sensors, logic executed by processing hardware, and communications systems. The logic may include hardware logic, software logic based on instructions accessed from storage and executed by hardware, or any combination thereof. Data collection may use a device that connects to a CAN connector, such as a J1939 connector, on a vehicle. Sensors may be located, and the logic may be executed, by hardware on the vehicle and/or at one or more remote location. When some or all of the hardware for the logic, or the storage or sources for the data, is remote, then the one or more communication systems may be used to communicate relevant information as required. By the term "communication system", we mean any system capable of transmitting and/or receiving information electronically; for example, alone or in combination, whether wired or wireless: a local area network (LAN), a wide area network (WAN), a personal area network (PAN), a hardware bus, or a cable.

Indicia of driver performance collected by one or more individual vehicles may be received over a communication system at some remote facility for display or analysis. Indicia might be averaged over a set of vehicles, and/or over some interval of time. A manufacturer might use such data to evaluate its vehicles or the vehicles of a competitor. A fleet operator might use such data for accountability of its drivers, or to make decisions about current environmental conditions.

Reserve acceleration (and hence drivability) depends on vehicle physical dynamics processes, and, in particular, on the net force applied to the vehicle. The net force on the vehicle depends on the vehicle load, environmental conditions, and fuel usage. Fuel usage, in turn, depends on the driver's operation of the gear and accelerator controls. Current fuel usage can be monitored, although accuracy may require some function fitting or estimation based on observation of the current state of the internal components of the vehicle. Fuel drives the engine, which produces torque. The torque is transmitted, albeit with some loss to heat and vibration, through the powertrain (e.g., clutch or torque converter; transmission; and rear axle), to the wheels and tires. Force on the vehicle due to fuel usage depends on torque, generated from fuel consumption, on the tires.

The logic combines a trip dynamics model of vehicle components and such physical dynamics processes, real-time observations about the vehicle and the environment, and data known about the vehicle from the manufacturer or previous data collection and analysis. The model uses mathematical and physical equations, which may be approximated (e.g., discretized or otherwise simplified), to calculate or estimate indicia of driver performance. Any or all of the data used in these calculations, as well as the results of the calculations, may be saved to and/or retrieved from tangible storage.

An exemplary model will be presented in the Detailed Description of this document. Each item contained in the display is a variable in the model, and those variables are organized herein into a set of variable tables, each table containing a group of variables that are related to a vehicle system or to a component of the TDE (e.g., the display). There are also a set of equation tables, each table containing a set of equations similarly grouped. Each variable table also gives one or more sources for how a variable may be obtained. A source is either a basic source—a generally known quantity (e.g., gravitational acceleration), a measurement or observation (e.g., engine speed, road grade), a specification provided by a manufacturer, a statistic based on historical observation of vehicles, or a user preference—or an equation in the equation tables. When the source is an equation, the variable will be related functionally to other variables in the variable tables. Each of these other variables can therefore be sourced analogously. All variables in the display, and indeed all variables in the particular model provided herein as exemplary, can be traced by the above process back to a set of basic sources. The tables, therefore, provide a complete (in an exemplary embodiment of the invention) set of processes for obtaining any variable in the exemplary model and in any of the figures.

In addition to coaching a real driver in a real vehicle, other applications of the trip dynamics model, and observations collected by TDEs in one or more vehicles, are possible within the scope of the invention. For example, (1) a real driver might be taught how to improve fuel efficiency with a simulated vehicle that displays indicia of driver performance; (2) a fleet manager might evaluate a particular vehicle by simulating a set of typical missions for that fleet with the vehicle to see how it compares with other vehicles; or (3) a manufacturer of a vehicle, or of a vehicle component, might evaluate various candidate configurations of design to predict performance and choose a best design.

The modeling approach has much wider applicability than the trip dynamics display. Suppose, by way of illustration, that an equation specifies A as a function of B and C, and suppose that function is not known publicly. For example, a vehicle or component manufacturer might know the function, but might not be willing to reveal it for competitive or legal reasons. Using the vast amounts of data that can be collected by the TDEs from operation of real vehicles and from sources of environmental data, mathematical fitting of the equations of the model can be used to infer such relationships quite accurately.

The equations in the model may be used in different sequences for different purposes. If the source of variable B in the source tables is an equation that shows B to be a function of A, then A is also mathematically related to B, but A might not be a function of B. For a given value of B, there may be more than one value of A. In such a case, data collection can be used to eliminate the ambiguities, allowing such a relationship to find the correct value of A in particular situations.

BRIEF DESCRIPTION OF THE DRAWINGS

FIG. 1 is a table of variables relating to scoring driver performance in a trip dynamics model.

FIG. 2 is a table of variables relating to vehicle motion in a trip dynamics model.

FIG. 3 is a table of variables relating to fuel consumption and engine dynamics in a trip dynamics model.

FIG. 4 is a table of variables relating to clutch dynamics in a trip dynamics model.

FIG. 5 is a table of variables relating to torque converter dynamics in a trip dynamics model.

FIG. 6 is a table of variables relating to transmission dynamics in a trip dynamics model.

FIG. 7 is a table of variables relating to rear axle dynamics in a trip dynamics model.

FIG. 8 is a table of variables relating to tire and driveline dynamics in a trip dynamics model.

FIG. 9 is a table of variables relating to brake dynamics in a trip dynamics model.

FIG. 10 is a table of variables relating to dynamics of resistance to vehicle motion in a trip dynamics model.

FIG. 19 is a table of model equations relating to driver performance scoring in a trip dynamics model.

FIG. 20 is a table of model equations relating to vehicle motion in a trip dynamics model.

FIG. 21 is a table of model equations relating to fuel consumption and engine dynamics in a trip dynamics model.

FIG. 22 is a table of model equations relating to clutch dynamics in a trip dynamics model.

FIG. 23 is a table of model equations relating to torque converter dynamics in a trip dynamics model.

FIG. 24 is a table of model equations relating to transmission dynamics in a trip dynamics model.

FIG. 25 is a table of model equations relating to rear axle dynamics in a trip dynamics model.

FIG. 26 is a table of model equations relating to tire and driveline dynamics in a trip dynamics model.

FIG. 27 is a table of model equations relating to brake dynamics in a trip dynamics model.

FIG. 28 is a table of model equations relating to dynamics of resistance to vehicle motion in a trip dynamics model.

DETAILED DESCRIPTION OF EXEMPLARY EMBODIMENTS

Figure 11:
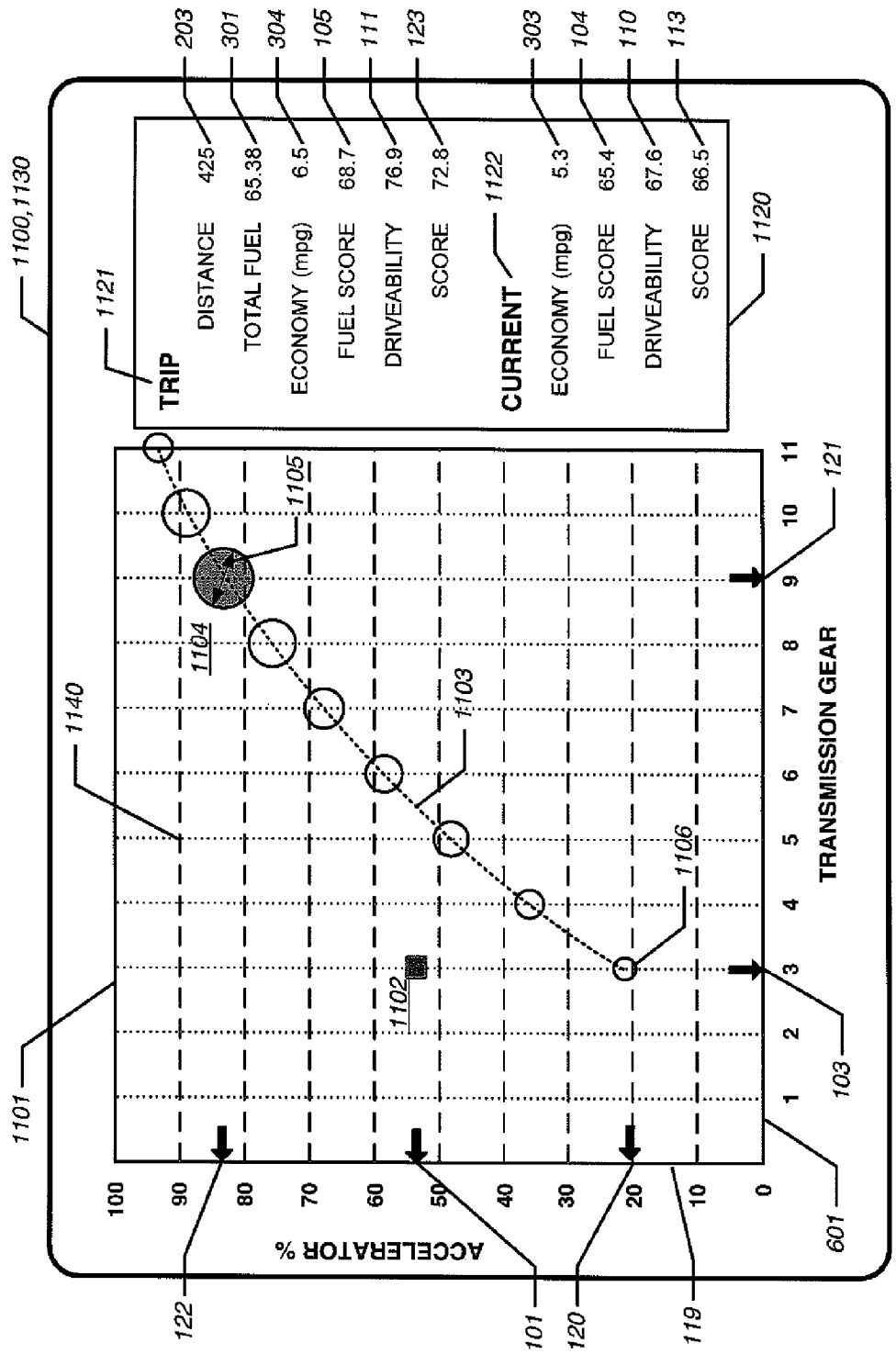
FIG. 11 illustrates an exemplary trip dynamics display to guide a driver in selecting transmission gear and throttle position to optimize fuel economy.

This description provides embodiments intended as exemplary applications of the invention. The reader of ordinary skill in the art will realize that the invention has broader scope than the particular examples described here. Although many of the concepts and innovations apply to any motor vehicle, the primary area of applicability of teachings herein is heavy-duty vehicles, especially commercial trucks.

FIG. 1-10 are tables that define a set of exemplary variables which pertain to the dynamics of a heavy-duty vehicle. Each figure contains a set of variables, in table rows, loosely grouped by system or by function. The groupings provide a convenient but rather arbitrary organization, and other groupings may be equally useful. Many of the variables will be used in subsequent figures and associated text. The variables are abbreviated by symbols, many of them involving subscripts, superscripts, and Greek letters. The table organization of the variables and equations will hopefully simplify reading and understanding this document for the reader. The reader will recognize that the variables and equations tables represent illustrative embodiments of the invention. Other embodiments may use some additional variables or equations, or some different variables or equations, or fewer variables or equations.

All of the variables tables have the same column headings, so only the column headings in the first variables table have been given reference numerals. The first column in each variables table is reference numeral (REF. 130). The second column is the symbol (SYM. 131) for the variable. The third column is a definition of the variable. The next four columns (columns 4-7) give a source or sources for the variable in the model. A variable may have one or more source, and not all possible sources are listed in the tables. A variable may be measured (MEAS. 133), obtained from an equation (EQN. 134), specified (SPEC. 135), or simply a quantity or function that may vary (VBL. 136), such as time or throttle pedal position. The MEAS. 133 column contains the following entries: CAN (a network on a vehicle); History (statistics from previously collected data); ECU (a controller in a vehicle); GPS (a locating device); internet sources (WWW); or Scale (to measure weight). The EQN. 134 column refers to an equation, by equation number in the equations table, from which the variable may be calculated. Sources in the SPEC. 135 column are means of specification. These include "User" for user-specified; "Mfr." for a value specified by a vehicle or component manufacturer; "Mfr map" for a mapping, table, or function from a manufacturer; "Tire mfr. map" for such a map, specifically from a tire manufacturer; or "Const." for a known constant. The VBL. 136 is checked with an "x" for variable quantities. The USED 137 column lists numbers for equations in which the particular variable appears.

FIG. 1 defines the following variables and corresponding symbols related to driver performance scoring: current throttle pedal position 101; current clutch pedal position 102; current transmission gear number 103; fuel economy score 104; time-averaged fuel economy score 105; fuel economy weight factor 106; instantaneous drivability 107; average drivability 108; maximum drivability 109; drivability score 110; time-averaged drivability score 111; drivability weight factor 112; score 113; current score 114; score function 115; best score 116; best score for any gear 117; throttle step size for the grid 118; throttle position 119; best throttle position 120; best gear number 121; best throttle position 122; and time-averaged score 123.

FIG. 2 defines the following variables and corresponding symbols related to vehicle motion: vehicle velocity 201; vehicle speed 202; distance traveled 203; vehicle acceleration 204; magnitude of vehicle acceleration 205; vehicle position 206; magnitude of reserved vehicle acceleration 207; mass of payload 208; mass of chassis 209; mass of body 214; mass of trailer 215; vehicle mass 210; effective vehicle mass 211; time 212; and particular time 213.

FIG. 3 defines the following variables and corresponding symbols related to the engine and fuel system: trip fuel 301; fuel mass flow rate 302; instantaneous fuel economy at steady state 303; average fuel economy 304; maximum fuel economy 305; angular speed 306; angular acceleration 307; engine idle angular speed 308; engine governed angular speed 309; engine moment of inertia 310; engine indicated torque 311; engine friction torque 312; engine brake torque 313; engine load torque 314; and engine effective torque 315.

FIG. 4 defines the following variables and corresponding symbols related to the clutch on a vehicle having a manual transmission: clutch pedal position 401; clutch input speed 402; clutch output speed 403; clutch speed difference 404; Maximum clutch speed difference 405; clutch input torque 406; clutch output torque 407; clutch maximum friction torque 408; and parameters 409; and 410.

FIG. 5 defines the following variables and corresponding symbols related to the torque converter (TC) on a vehicle having an automatic transmission: TC angular input (pump) speed 501; TC angular output (turbine) speed 502; TC input torque 503; TC output torque 504; TC speed ratio 505; TC efficiency ratio 506; and TC power ratio 507.

FIG. 6 defines the following variables and corresponding symbols related to the transmission: transmission gear numbers 601; transmission gear ratio 602; current transmission gear ratio 603; forward transmission gears 604; reverse transmission gears 605; transmission input speed 606; transmission output speed 607; transmission gear efficiency 608; transmission input torque 609; transmission output torque 610; and transmission moment of inertia 611.

FIG. 7 defines the following variables and corresponding symbols related to the rear axle: rear axle input speed 701; rear axle output speed 702; rear axle gears 703; rear axle current gear ratio 704; gear efficiency at gear ratio 705; rear axle input torque 706; rear axle output torque 707; and rear axle moment of inertia 708.

FIG. 8 defines the following variables and corresponding symbols related to the rear axle tires and wheels: tractive torque 801; tractive force 802; effective combined gear ratio 803; driveline efficiency 804; Wheel angular speed 805; Wheel angular acceleration 806; moment of inertia 807; Effective moment of inertia 808; tire radius 809; tire pressure 810; and tire temperature 811.

FIG. 9 defines the following variables and corresponding symbols related to the brakes: brake pedal position 901; current brake pedal position 902; and brake force 903.

FIG. 10 defines the following variables and corresponding symbols related to resistive forces acting on the vehicle: elevation 1001; air pressure 1002; air temperature 1003; air density 1004; wind velocity 1005; effective area 1006; aerodynamic drag coefficient 1007; grade angle 1008; longitudinal gravitational force 1009; normal gravitational force 1010; gravitational acceleration 1011; aerodynamic drag 1012; rolling resistance coefficient 1013; rolling resistance force 1014; and resistive force 1015.

Figure 27:
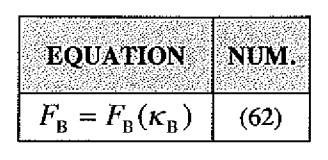

These variables are related to each other in the exemplary system of model equations shown in the equations tables: driver performance scoring (FIG. 19); vehicle motion (FIG. 20); fuel consumption and engine dynamics (FIG. 21); clutch dynamics (FIG. 22); torque converter dynamics (FIG. 23); transmission dynamics (FIG. 24); rear axle dynamics (FIG. 25); tire and driveline dynamics (FIG. 26); brake dynamics (FIG. 27); and dynamics of resistance to vehicle motion (FIG. 28). The columns in each of these equations tables are EQUATION 1920 (the equation) and NUM. 1921 (the equation number).

FIG. 11 illustrates an exemplary display 1100 in a trip dynamics executor (TDE) 1360, which may guide a driver 1350 in selecting a transmission gear number 601 and a throttle position 119 to optimize fuel economy. The display 1100 depicts a user interface (UI) 1130 that includes a chart 1101 and a set of performance statistics 1120 or diagnostics 1120. The chart 1101 may include a grid 1140. The grid 1140 includes a horizontal axis that represents transmission gear number 601 and a vertical axis that represents throttle position 119. At any given time, the current throttle pedal position 101 and current transmission gear number 103 chosen by the driver 1350 may be indicated on the grid 1140 as a point, at the center of a square, representing the current gear-throttle pair 1102.

For every transmission gear number 601, there may be a best throttle position 120, which is "best" objectively because it maximizes (or minimizes) some user-selected score function 115. The resulting score is the best score 116 for that transmission gear. The pair of a transmission gear number 601 and the best throttle position 120 for that gear describe a point 1106 on the grid 1140. The set of all such best points 1106 lie on a curve 1103, and may be indicated by circles in the display. As illustrated, the diameter 1105 of each such circle is proportional to the score 113 for that point 1106. Similarly, the size of the symbol (in this case, a square) for the current gear-throttle pair 1102 is correspondingly proportional to its score 113. The pair of best gear number 121 and best throttle position 120 correspond to the point best grid-throttle pair 1104 on the curve 1103 having the highest overall best score for any gear 117 is emphasized, in this example by shading. Other means of emphasis might be used, such as color, crosshatching, or animation. For esthetic reasons, a dashed line is shown passing through the circled points on the curve 1103, although obviously transmission gear numbers have only integer values.

Note that there are many other ways that regions of relatively good or bad scores 113 on the grid might be displayed. One such method would be a color contour plot of the scoring function, which can be regarded as describing a surface above the grid 1140. The invention encompasses all approaches of representing scoring information to the driver 1350 for guidance.

The driver 1350 might improve the performance score 113 by adjusting the throttle position 119 and/or shifting to a different transmission gear number 601 to move to a point on the grid 1140 where the goodness 113 is higher. For example, by simply shifting from 3rd to 6th or 7th gear, performance will be improved. Ideally, the driver 1350 in the illustrated situation would be in 9th gear and have the throttle 83% depressed.

One might ask why the grid 1140 shows any points on the curve 1103 other than the best grid-throttle pair 1104. We note in response that ambient traffic and regulatory conditions might preclude the driver 1350 from operating the vehicle 1300 at the best point. Consequently, the driver 1350 needs more information than the best grid-throttle pair 1104 to optimize performance under such constraints. A more sophisticated scoring system in an embodiment of the invention might take such constraints imposed upon the driver 1350 into account in more fairly rating performance. A constraint might be known (e.g., a speed limit or a construction zone) or inferred (e.g., the vehicle 1300 is determined based upon observations by the trip dynamics logger 1361) to be moving slower than posted speeds on a highway segment known for stop-and-go rush hour traffic). Real time traffic data from external sources might also be taken into account. The scope of the invention includes any scoring system that utilizes a model of vehicle dynamics to estimate driver performance scoring parameters and, hence, includes such more sophisticated systems.

The performance statistics 1120 fall into two categories, trip diagnostics 1121 and current diagnostics 1122. The current diagnostics 1122 include current values of fuel economy score 104; drivability score 110; and overall score 113; and instantaneous fuel economy at steady state 303. The trip diagnostics 1121 include time-averaged (typically, over a trip or mission) values: time-averaged fuel economy score 105; time-averaged drivability score 111; and overall time-averaged score 123; and average fuel economy 304, as well as total distance traveled 203 and trip fuel 301. A fleet manager might provide a driver with an incentive or reward for achieving a score (whether fuel, drivability, or overall) in some specified range.

Figure 12:
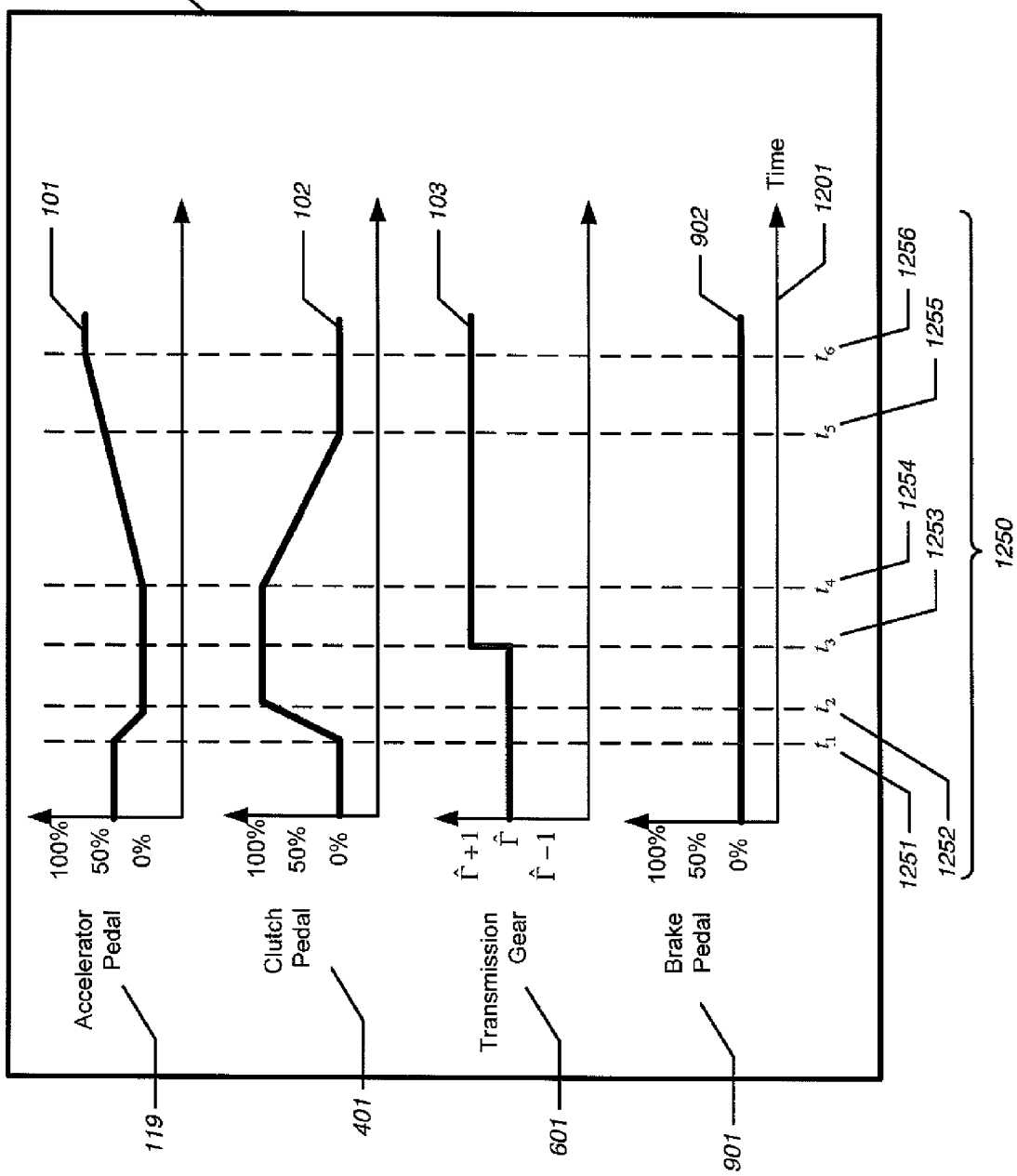
FIG. 12 is a set of synchronized time series illustrating events in driver operation of vehicle controls.
Figure 13:
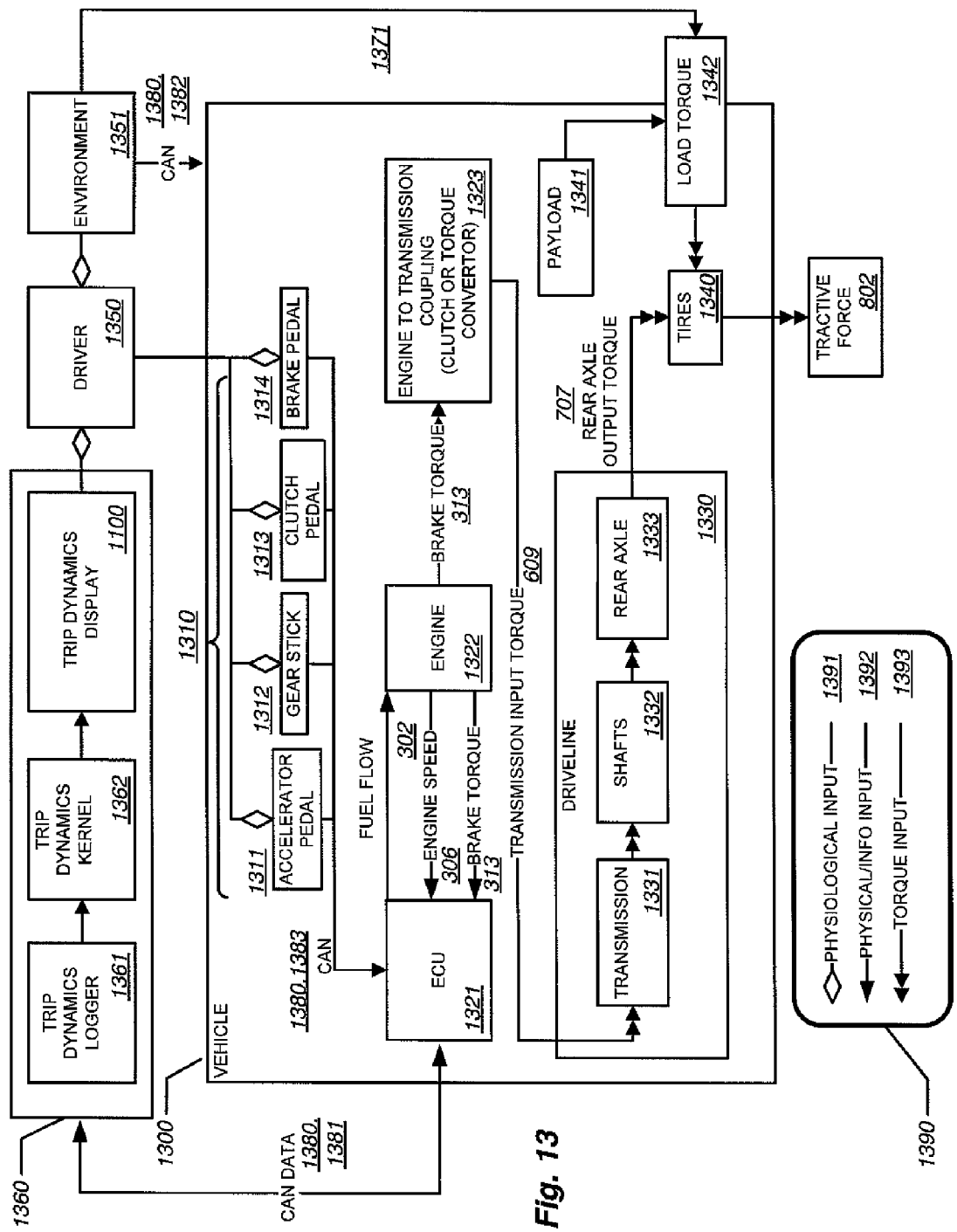
FIG. 13 is a block diagram, which represents a vehicle, and a trip dynamics executor to observe and analyze vehicle performance and guide a driver to improve performance.

A purpose of the chart 1101 and diagnostics 1120 in some embodiments of the invention is to improve performance by the driver 1350 of a vehicle 1300. As shown in FIG. 13, the driver controls 1310 that are relevant to the TDE 1360 include clutch pedal 1313, throttle 1311, gear stick 1312, and brake pedal 1314. FIG. 12 is a driver time series chart 1200 illustrating how those driver controls 1310 might be manipulated over some interval of time 212 to shift gears. The graphs for throttle position 119, clutch pedal position 401, transmission gear number 601, and brake pedal position 901 are synchronized with a common time axis 1201. The graphs show, respectively, current throttle pedal position 101, current clutch pedal position 102, current transmission gear number 103, and current brake pedal position 902.

As shown by FIG. 12, a sequence of driver events 1250 occur during the time interval. This current information is typical of the kind of dynamic information that can be observed by the trip dynamics logger 1361 and analyzed by the trip dynamics kernel 1362. The driver starts disengaging the current gear 1251, then fully depresses the clutch 1252, then shifts to the new gear 1253, then starts engaging the new gear 1254, and finally fully engages the new gear 1255. The brake pedal 1314 is not used during this sequence. As shown in the tables of FIGS. 1 and 9 and the vehicle model of FIG. 13, driver events 1250 are available through a communication network within the vehicle 1300 to the TDE 1360 for storage, analysis, and to provide diagnostics to users. Most modern heavy-duty vehicles are equipped with a CAN 1380 communication system, which may be accessible through a connector in the vehicle 1300, usually a J1939 connector in the dashboard.

As mentioned previously, a driver 1350 might be a simulated or virtual driver rather than a human. Collection of data by a TDE over time will allow drivers 1350 of various types (e.g., having a specified number of years of experience; employed by a particular fleet manager; or assigned certain metropolitan areas) to be simulated with statistical accuracy. A typical statistical distribution of such driver 1350 types might be used to evaluate how a vehicle 1300 or a fleet might perform over a suite of varying conditions (e.g., load, distance, environment). When optimizing a score function or other reference function, we are in effect operating the vehicle 1300 with a virtual driver 1350, using our models to determine choices to test various combinations of choices or actions by such a virtual driver 1350 result in the optimum set of choices. A virtual vehicle 1300 might be used to compare various choices of vehicles to determine which vehicle, or suite of vehicles, is optimal for a particular task or suite of tasks.

FIG. 13 is a model of a system including a vehicle 1300, a driver 1350, and an external environment 1351. As described in the legend 1390, illustrative physiological 1391, physical/information 1392, and torque 1393 inputs are indicated by arrowhead type. The model is one instance of a class of models, within the scope of the invention, whereby physiological inputs from the driver modify the motion of a vehicle through transfer of physical quantities.

Physiological 1391 inputs from the driver 1350 is transferred to the engine control unit (ECU, also known as the power-train control module) 1321 over the CAN 1380, as indicated by arrow 1383, to set the fuel mass flow rate 302 to the engine 1322. Information about the state of systems in the vehicle 1300, such as engine angular speed 306 and engine brake torque 313, are transferred to the ECU 1321, and may be accessed by the TDE 1360 over the CAN 1380, as indicated by arrow 1381.

Resulting engine brake torque 313 is transferred to the engine-to-transmission coupling 1323 (a clutch for a manual transmission 1331 or a torque converter for an automatic). The output torque from the coupling 1323 is transferred to the driveline 1330 (including the transmission 1331, the drive shafts 1332, and the rear axle 1333) as transmission input torque 609. Output torque from the driveline 1330 is transferred to the rear wheels and the rear tires 1340 as rear axle output torque 707.

Information about the environment 1351 in which the vehicle 1300 is operating is transferred over the CAN 1380 to the vehicle 1300, as indicated by arrow 1382. Such environmental data may be available to the TDE 1360 over the CAN 1380 as well.

Environmental conditions 1371 and the payload 1341 exert a load torque 1342 on the rear tires 1340. The combined torque on the rear tires 1340 results in a tractive force 802 on the vehicle 1300, causing it to accelerate. The reserve acceleration is calculated by assuming the application of full throttle starting from a vehicle 1300 moving at steady state in the current transmission gear number 103.

Like the driver 1350, a vehicle 1300 may be real or simulated. Simulated vehicles are useful at least for vehicle, system, and component design; driver training; fleet cost estimation; and mission route selection. Likewise, the evolution of an environment 1351 can be simulated, based on statistics or a dynamic model of the atmosphere, and geographic information systems when convenient for some purpose at hand.

FIG. 13 shows an exemplary TDE 1360, which includes a trip dynamics logger 1361; a trip dynamics kernel 1362; and a trip dynamics display 1100. The trip dynamics logger 1361 collects, and stores in tangible storage, data accessed from the CAN 1380. This data may pertain to any of the components of the vehicle 1300, as well as to any other data collected by vehicle systems and sensors, such as environmental data. Environmental and map data may also be collected and stored by the trip dynamics logger 1361 from other sources (not shown), such as weather stations and Internet websites, research facilities, or company or government databases.

The trip dynamics kernel 1362 may analyze data, communicate information, and cause actions to be taken. The trip dynamics kernel 1362 may compute the variables such as those in the tables of FIG. 1-10, possibly using a vehicle 1300 model such as that of FIG. 13, combined with a physical dynamics model such as that illustrated by the equation tables of FIG. 19-28. The kernel 1362 may produce and manage a trip dynamics display 1100 as exemplified by FIG. 11.

Note in FIG. 13 that arrow 1381 is double headed. In some embodiments of the invention, the kernel 1362 may determine that the vehicle 1300 itself is operating suboptimally, and send a command to the ECU 1321 or other component or system, causing the vehicle 1300 to change its behavior.

Hardware components of a TDE 1360 may be located in the vehicle 1300, or they may be remote from the vehicle 1300. The hardware, logic, and functionality may each be split between local and remote. Local hardware may communicate with remote hardware over a communication system of any type capable of electronically transmitting and/or receiving information. Logic may be embodied in hardware, or in software instructions accessible from hardware devices including tangible storage or communication hardware.

Figure 14:
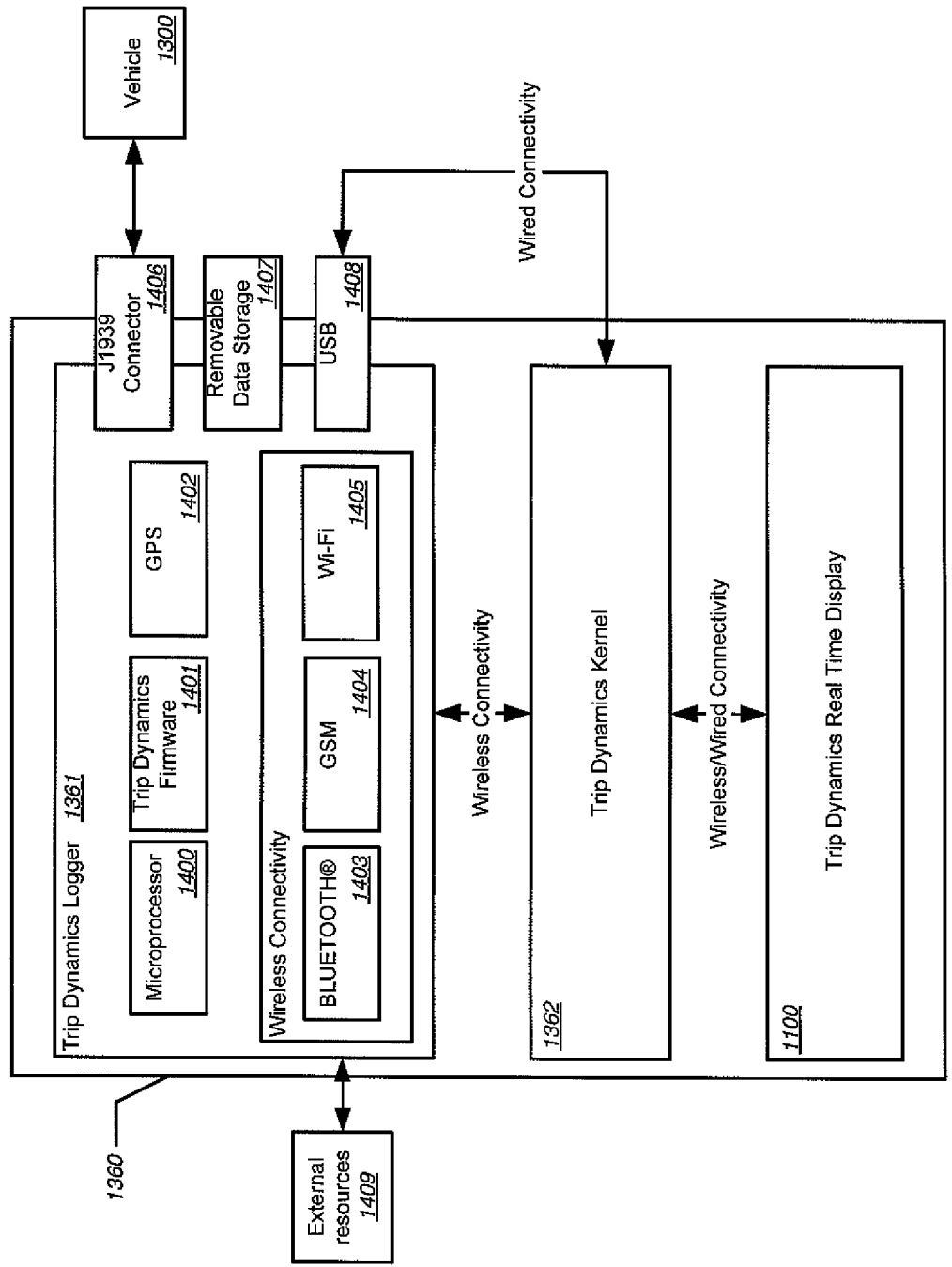
FIG. 14 is a block diagram showing components of an exemplary trip dynamics logger.

FIG. 14 is an exemplary TDE 1360 showing more detail, particularly of an exemplary trip dynamics logger 1361. This trip dynamics logger 1361 can be inserted into a connector in the vehicle 1300. Such a connector, such as a J1939 connector 1406 is fairly standard in modern heavy-duty vehicles 1300. The connector 1406 puts trip dynamics logger 1361 into communication with the CAN 1380. The trip dynamics logger 1361 includes a microprocessor 1400 to execute logic and access data; firmware 1401 to store instructions and data; a GPS 1402 device to locate the vehicle 1300 in three-space—note that another trip dynamics logger 1361 might include other environmental sensors; tangible storage (removable storage 1407 in this embodiment) to store instructions and data, and as a form of communication with external devices (by inserting or removing the device); and other forms of communication with the kernel 1362, the display 1100 or with external resources 1409—in this example, namely BLUETOOTH 1403, Global System for Mobile Communications (GSM) 1404, and Wi-Fi 1405. The trip dynamics kernel 1362 and/or logic for the display 1100 may be running in the microprocessor 1400 of the trip dynamics logger 1361 or in some other microprocessor.

Figure 15:
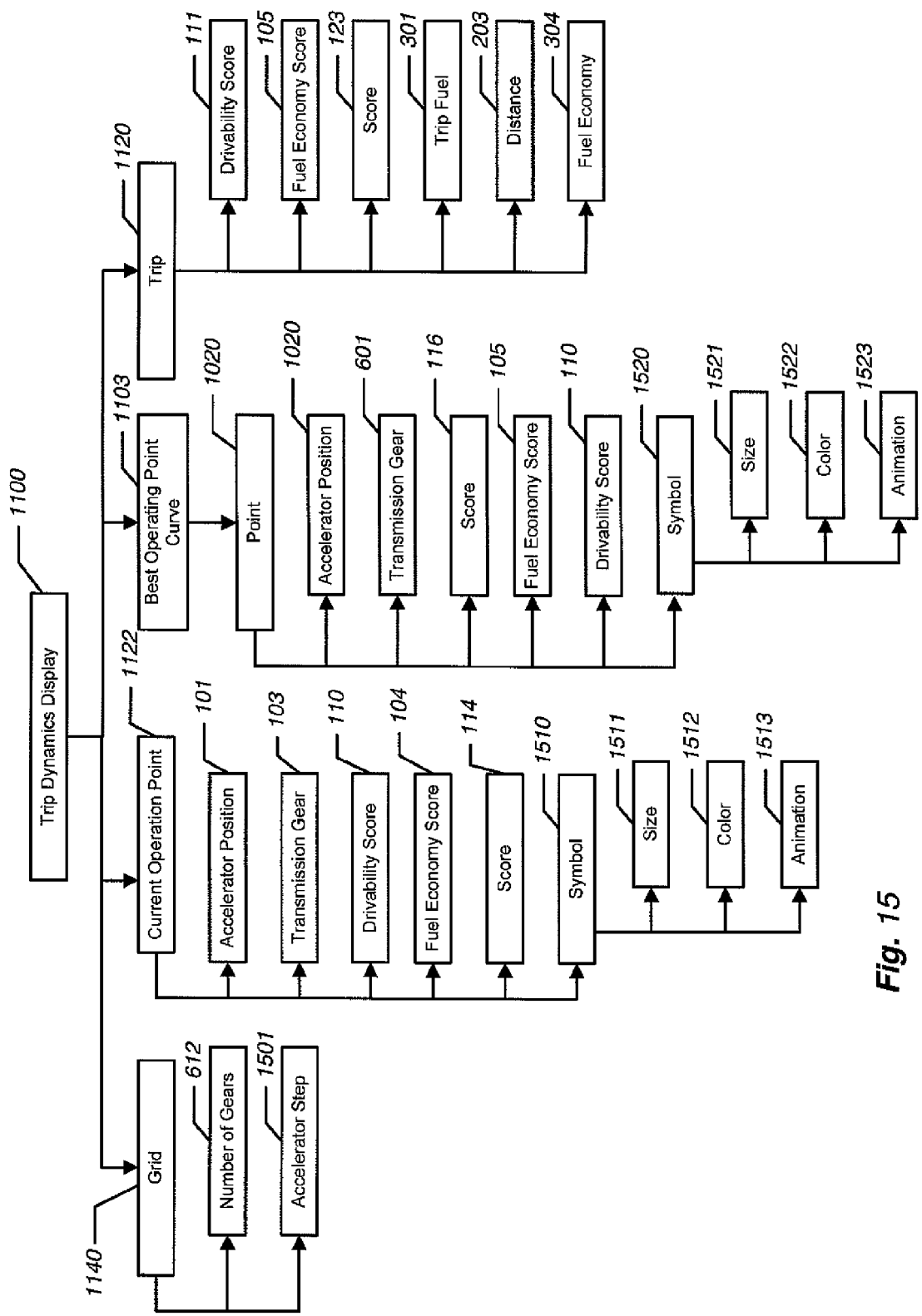
FIG. 15 is a tree diagram showing features that are displayed in an exemplary trip dynamics display.

FIG. 15 illustrates a tree of parameters that may be used to create a chart 1101 and performance statistics 1120 like FIG. 11. Many of these parameters are in the variables tables, or were described in connection with FIG. 11 itself. The remaining parameters are user preferences for the chart 1101. These include the throttle step 1501 (i.e., the separation between tick marks on the throttle axis); the symbol 1510 for the current operation point, as well as its size 1511, color 1512, and animation 1513; and the symbol 1520 for the best operation point, as well as its size 1521, color 1522, and animation 1523 (Color or animation can be used to distinguish certain points on the chart 1101 in lieu of the shading that was used in FIG. 11.)

FIG. 15 illustrates a tree of parameters that may be used to create a chart 1101 and performance statistics 1120 like FIG. 11 in near-real-time. Most of these parameters were already described either in the variables tables, or in connection with FIG. 11 itself. The remaining parameters are user preferences for the chart 1101. These include the throttle step 1501 (i.e., the separation between tick marks on the throttle axis); the symbol 1510 for the current operation point, as well as its size 1511, color 1512, and animation 1513; and the symbol 1520 for the best operation point, as well as its size 1521, color 1522, and animation 1523. (Color or animation can be used to distinguish certain points on the chart 1101 in lieu of the shading that was used in FIG. 11.)

Figure 16:
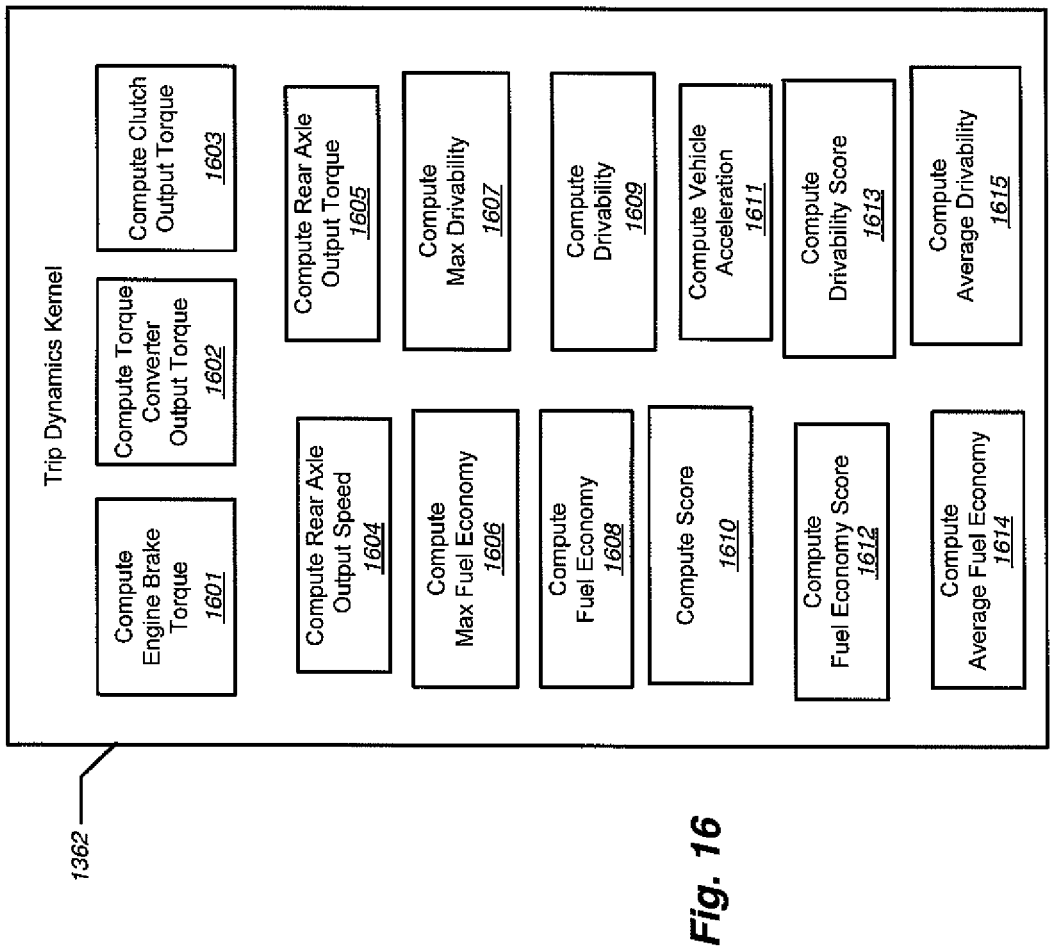
FIG. 16 is a block diagram showing some of the processes that are performed by an exemplary trip dynamics kernel.

The trip dynamics kernel 1362 uses a model of the vehicle 1300, such as shown in FIG. 13, to calculate as necessary any of the display components, possibly using data saved by the trip dynamics logger 1361. FIG. 16 illustrates some of the kinds of processes that may be executed by a trip dynamics kernel 1362. The trip dynamics kernel 1362 may compute engine brake torque 1601; compute torque converter output torque 1602; compute clutch output torque 1603; compute rear axle output speed 1604; compute rear axle output torque 1605; compute maximum fuel economy 1606; compute maximum drivability 1607; compute fuel economy 1608; compute drivability 1609; compute score 1610; compute acceleration 1611; compute fuel economy score 1612; and compute drivability score 1613. These processes can be used to populate the UI 1130 of the trip dynamics display 1100 and for many other purposes.

A trip dynamics kernel 1362 that has available a physical dynamics model as illustrated by FIG. 19-28 can implement logic to compute a set of variables, such as illustrated by FIG. 1-10. For the particular embodiments described herein, the variables tables and equation tables combine to allow the computation of any "target" variable in the variables tables. Every variable in the variables table has a symbol and at least one source. If a variable has a plurality of sources listed, then any one of those sources is sufficient to obtain the variable. If a source is anything other than an equation (specified in the variables table by equation number), then the source is a base source. If the desired, or target, variable is a base source, then it can be obtained by the trip dynamics kernel 1362 from that "base" source. Otherwise, the target variable depends on other source variables, as specified in the relevant equation in the equation tables. Such a source variable may itself be a base source, or obtained by some equation in the equation tables; and so forth. In essence, any variable in the variables tables can be regarded as the "root" in a tree diagram, with the base sources as "leaf nodes".

Once the required data is obtained from the base sources, the relevant equations, which have already been identified in traversing the tree from root to leaf nodes, can be applied to obtain the target variable. In effect, the above discussion demonstrates that all the processes listed in FIG. 16, as well as many more not explicitly listed there, are fully supported in this Description and the drawings.

Figure 17:
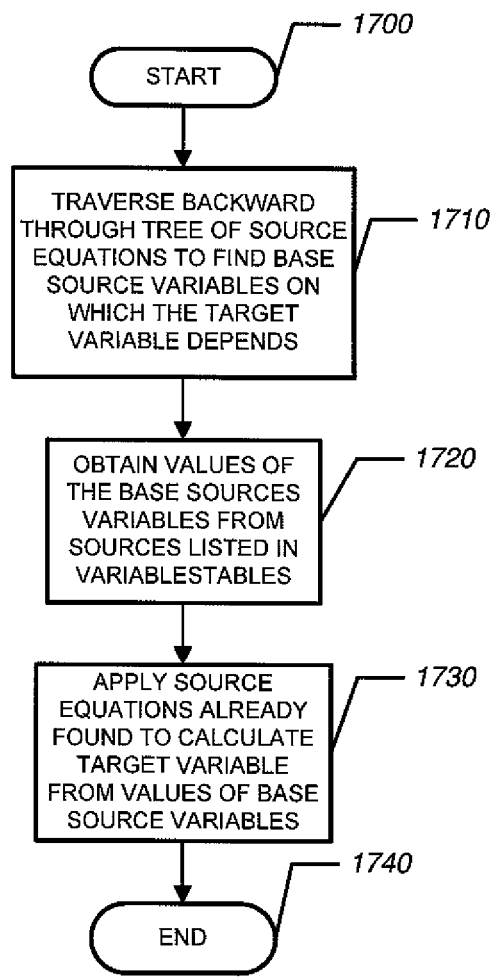
FIG. 17 is a flowchart for a process that can be used to calculate any variable in the variable tables, using the equations in the model equations tables, from base sources (e.g., observations, manufacturer's specifications, user preferences, and known values).

The above method for obtaining a process whereby any target variable in the variables tables can be sourced or calculated is summarized by FIG. 17. After the start 1700, traverse 1710 backward through the tree of source equations to find the base source variables on which the target variable depends. Obtain 1720 the values of those base source variables. Apply 1730 the source equations already found to calculate the target variable from the values of the base source variables. The method ends 1730.

The method of FIG. 17 can be used to specify a process to find any variable from FIG. 15 that is included in the variables tables. In effect, FIG. 17 is a metaprocess that teaches processes for computing every variable in an embodiment of the dynamics model.

Figure 18:
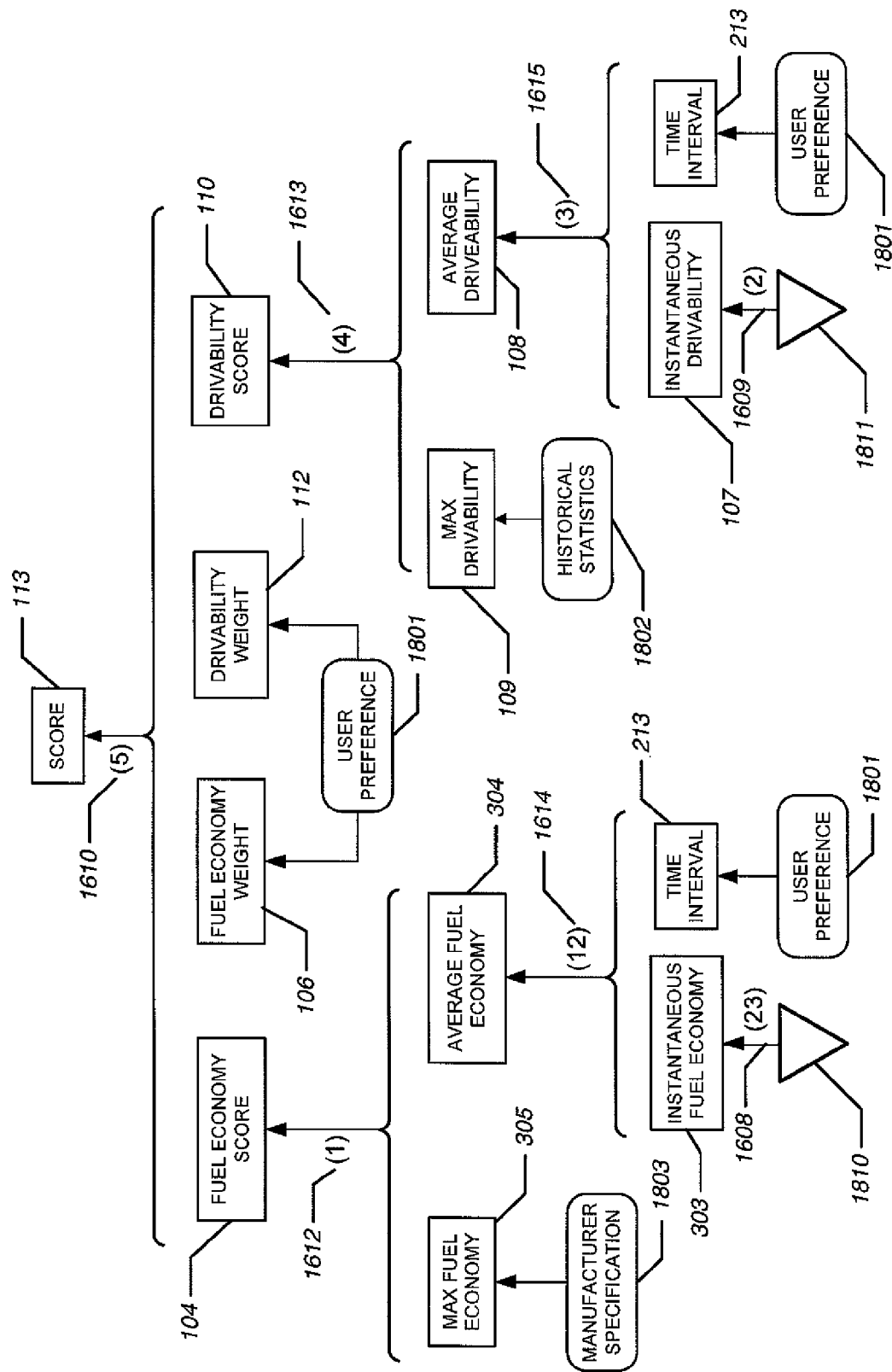
FIG. 18 is a tree diagram showing a process for computing goodness scores by an exemplary trip dynamics kernel.

FIG. 18 illustrates the method of FIG. 17 for the overall goodness score 113 variable used in the chart 1101 of FIG. 11. FIG. 18 illustrates relationships among the variables of FIG. 1-FIG. 10, the equations of FIG. 19-28, and the processes of the trip dynamics kernel 1362 shown in FIG. 16. (Note, however, that embodiments may differ with respect to equations, variables, and sources of particular variables.)

In FIG. 18, variables in the vehicle dynamics model, such as score 113 and average fuel economy 304 are represented by rectangles. In a given embodiment of the model, a variable is either a base source variable or calculated using an equation from other variables. For example, fuel economy weight factor 106, maximum drivability 109, and maximum fuel economy 305 are base source variables, derived from the respective sources user preference 1801, historical statistics 1802, and manufacturer specification 1803, which are shown in rounded rectangles. The users, or stakeholders, that might specify or influence user preferences 1801 include, for example, the driver 1350, a fleet owner/operator, a manufacturer, a supplier, a vehicle designer, a governmental entity, and an organization (e.g., environmental, energy, political).

If a variable is not a base source variable, it may be computed from an equation. Equation numbers that correspond to FIG. 19-28 are shown parenthetically in FIG. 18. For example, score 113 is computed from equation (5). As shown in FIG. 16, the trip dynamics kernel 1362 may compute score 1610 as one of its functions, and FIG. 18 shows that equation (5) indicates a process for doing so.

Accordingly, score 113 (in this particular embodiment) is found in equation (5) to depend directly on four variables, namely, fuel economy score 104, drivability score 110, fuel economy weight factor 106, and drivability weight factor 112. As taught by FIG. 17, we recurse through the tree to find all the base variables. Once the values of the base variables are obtained from their sources, we then go back up through the equations shown in the tree to ultimately calculate the score 113.

In fact, recursion through this particular tree may involve nearly all variables and equations in the model. Triangle 1810 indicates that the process compute fuel economy 1608 to compute instantaneous fuel economy at steady state 303 uses equation (23), the tree expansion of which is omitted from FIG. 18. Similarly, triangle 1811 indicates that the process compute drivability 1609 to compute instantaneous drivability 107 uses equation (2), the tree expansion of which is also omitted. Note, however, that FIG. 18 merely presents in an alternative form relationships that are already defined, comprehensively for this embodiment, by FIGS. 1-10 and 19-28.

A few closing remarks about FIG. 18 are in order. As the figure illustrates, the model configuration allows the trip dynamics kernel 1362 to calculate any of the variables in the tables. We conclude that FIG. 16 lists only a few of the processes that are taught by this Specification for certain embodiments of the invention. Also, FIG. 16 includes the process—compute maximum fuel economy 1606—while in FIG. 18, maximum fuel economy 305 is a base source variable obtained from manufacturer specification 1803. This illustrates that there may be more than way to obtain some of these variables. Similarly, FIG. 16 includes the process—compute maximum drivability 1607—while in FIG. 18, maximum drivability 109 is a base source variable obtained from historical statistics 1802, possibly obtained by the trip dynamics logger 1361 from observation of this or similar vehicles 1300.

Throughout this document and claims, the word "or" is used in the inclusive sense unless otherwise specified. Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. An apparatus, comprising:
  a) an electronic display;
  b) a first indicator on the display showing a best accelerator pedal position corresponding to a particular transmission gear number of a moving vehicle, wherein the best accelerator pedal position corresponding to the particular transmission gear number is determined by optimizing a score that, for the transmission gear number, depends on a current fuel consumption score and a current drivability score, wherein (i) the current drivability score is estimated using a physical dynamics model of the vehicle and collected data that pertains to the vehicle, (ii) the current drivability score depends upon reserve acceleration, and (iii) reserve acceleration is potential current acceleration the vehicle would have if current throttle position of the vehicle were increased to full throttle; and c) a second indicator on the display showing the current accelerator pedal position and current transmission gear, as obtained from the vehicle.

2. The apparatus of claim 1, wherein the position of the first indicator, and the score corresponding to the first indicator, change over time as the vehicle moves.

3. The apparatus of claim 1, wherein the display further shows the score corresponding to the first indicator and the score corresponding to the second indicator.

4. The apparatus of claim 3, wherein the fuel consumption for the first indicator is calculated using the dynamics model and collected data that pertains to the vehicle.

5. The apparatus of claim 3, wherein the fuel consumption for the second indicator is measured from the vehicle.

6. The apparatus of claim 1, further comprising:

d) a third indicator on the display, not necessarily distinct from the first indicator, showing an accelerator pedal position and a transmission gear number corresponding to the optimum score from the reference function among all combinations of accelerator pedal positions and transmission gear numbers available on the vehicle.

7. The apparatus of claim 1, wherein best accelerator pedal positions, corresponding respectively to each transmission gear number of the vehicle, are shown simultaneously by indicators on the display.

8. The apparatus of claim 1, wherein the display is contained in the vehicle.

9. The apparatus of claim 1, wherein the display further shows trip statistics regarding fuel efficiency and drivability.

10. The method of claim 1, wherein the physical dynamics model takes into account a time-dependent current loss of a propulsive quantity between an engine and a transmission of the moving vehicle.

11. The method of claim 10, wherein the propulsive quantity is force or torque.

12. The method of claim 10, wherein the physical dynamics model takes into account a time-dependent effect of changing gears.

13. The method of claim 10, wherein the physical dynamics model takes into account a time-dependent effect of use of a clutch, a brake, or an accelerator pedal.

14. The method of claim 10, wherein the physical dynamics model takes into account a time-dependent effect of operation of a torque converter.

15. The method of claim 10, wherein the transfer is calculated instantaneously at a plurality of times.

16. A method, comprising:

a) obtaining current accelerator pedal position and current transmission gear number from a vehicle;

b) calculating using electronic processing equipment and a physical dynamical model, which takes into account a time-dependent transfer of a propulsive quantity between two elements of a powertrain, a target accelerator pedal position and a target transmission gear number that optimize a score that depends on a current fuel consumption score and current drivability score, wherein (i) drivability depends upon reserve acceleration, and (ii) reserve acceleration is potential current acceleration the vehicle would have if the vehicle were currently given full throttle; and c) displaying the current accelerator pedal position, current transmission gear number, target accelerator pedal position, and target transmission number.

17. The method of claim 16, wherein the vehicle is a virtual vehicle that is simulated by execution of logic on electronic processing equipment.

18. The method of claim 16, wherein the pedal position and accelerator pedal position of the vehicle are set by a virtual driver that is simulated by execution of logic on electronic processing equipment.

19. An apparatus, comprising:

a) a sensor that includes a connector compatible with a matching connector in a vehicle and that, when so connected, monitors current accelerator pedal position and current gear number of the vehicle as the vehicle moves;

b) a physical dynamics model, which takes into account time-dependent loss of a propulsive quantity between an engine of the vehicle and a transmission of the moving vehicle, and which relates torques or forces on the moving vehicle to current accelerator pedal position and current gear number; and c) electronic processing equipment that employs logic to estimate current fuel usage of the moving vehicle using the physical dynamics model.

20. The apparatus of claim 19, wherein the connector and matching connector are J1939 connectors.

21. The apparatus of claim 19, wherein the sensor obtains current accelerator pedal position or current gear number from a communication network in the vehicle.

22. The apparatus of claim 19, wherein the sensor uses a geographical positioning system to determine the vehicle position.

23. The apparatus of claim 19, wherein the sensor contains wireless communication hardware and logic that the sensor uses to request and receive environmental data across a network from remote sources.

24. The apparatus of claim 19, wherein the sensor contains wired or wireless communication hardware and logic, which the sensor uses to communicate with, and provide relevant data to, the logic that estimates fuel usage of the vehicle.

25. The apparatus of claim 19, wherein the sensor contains wired or wireless communication hardware and logic, which the sensor uses to communicate with, and provide relevant data to, logic that estimates actual or reserve acceleration of the vehicle.

26. The apparatus of claim 19, wherein the electronic processing equipment employs logic to estimate current drivability of the moving vehicle using the physical dynamics model, wherein the current drivability depends upon reserve acceleration of the moving vehicle.

27. A method, comprising:

a) connecting a sensor to a communication system in a vehicle;

b) monitoring by the sensor current accelerator pedal position and current gear number of the vehicle as the vehicle moves; and c) executing by processing hardware a model, which takes into account time-dependent loss of a propulsive quantity between an engine of the vehicle and a transmission of the moving vehicle, and which relates torques or forces on the moving vehicle to the current accelerator pedal position and the current gear number to estimate current drivability of the moving vehicle, wherein current drivability depends upon acceleration the moving vehicle would have if the moving vehicle were given full throttle.

28. The apparatus of claim 27, wherein the processing hardware estimates a current loss of a propulsive quantity between an engine of the moving vehicle and a transmission of the moving vehicle.

29. A system, comprising:
a) a trip dynamics logger that, when installed in a moving vehicle (i) monitors driver controls of the vehicle and physical properties of its engine, driveline, rear axle, and tires, and (ii) saves information from the monitoring in tangible storage; and
b) a trip dynamics kernel that optimizes a score that depends upon scores for current fuel efficiency and current drivability of the moving vehicle using the saved information and a physical dynamics model that takes into account a time-dependent transfer of a propulsive quantity between two elements of a powertrain, wherein the current drivability score depends upon reserve acceleration, wherein reserve acceleration is an acceleration the vehicle would have if the vehicle were given full throttle.

30. The system of claim 29, wherein the trip dynamics logger contains wired or wireless communication hardware and logic, which the logger uses to communicate with, and provide relevant data to, the trip dynamics kernel.

31. The system of claim 29, wherein the trip dynamics logger contains wired or wireless communication hardware and logic, which the logger uses to communicate with a sensor that connects to the vehicle and monitors state of an engine, drivetrain, or axle in the vehicle.

32. The system of claim 29, wherein the trip dynamics logger contains wireless communication hardware and logic that the logger uses to request and receive environmental data across a network from remote sources.

33. An apparatus, comprising:
a) an electronic display;
b) a first indicator on the display showing a best accelerator pedal position corresponding to a particular transmission gear number of a moving vehicle, wherein the best accelerator pedal position corresponding to the particular transmission gear number is determined by optimizing a score that, for the transmission gear number, depends on a current fuel consumption and a current reserve acceleration, wherein the current reserve acceleration is estimated using a physical dynamics model of the vehicle and collected data that pertains to the vehicle, and wherein the physical dynamics model takes into account time-dependent losses of a propulsive quantity between an engine of the vehicle and a transmission of the vehicle.

* * * * *